United States Patent [19]
Bergomi, Jr. et al.

[11] 3,755,219
[45] Aug. 28, 1973

[54] RESIN BLEND CONTAINING ETHYLENE/VINYL CHLORIDE INTERPOLYMER

[75] Inventors: Joseph G. Bergomi, Jr.; Dale R. Dill, both of St. Louis; Paul R. Graham, Ballwin, all of Mo.

[73] Assignee: Monsanto Company, St. Louis, Mo.

[22] Filed: Feb. 28, 1972

[21] Appl. No.: 230,139

[62] Division of Ser. No. 877,486, Nov. 17, 1969, Pat. No. 3,665,060.

[52] U.S. Cl............. 260/8, 117/155 UA, 117/156, 260/17.4 ST, 260/29.6 RW, 260/41 C, 260/897, 260/29.6 WB
[51] Int. Cl. ............................................. C08f 15/00
[58] Field of Search.................. 260/897, 29.6, 8; 117/155 UA

[56] References Cited
UNITED STATES PATENTS
3,576,915  4/1972  Graham et al. ................. 260/897
3,428,582  2/1969  Deex .................................. 260/8
2,483,959  10/1949  Baer .............................. 260/45.75

*Primary Examiner*—Murray Tillman
*Assistant Examiner*—C. J. Seccuro
*Attorney*—R. J. Klostermann

[57] ABSTRACT

Modified ethylene/vinyl chloride interpolymers blended with unsaturated polybasic carboxylic acid interpolymers useful as pigment binders or adhesives in pigment coating compositions for paper, paperboard and similar materials, said modified interpolymer being used along or in combination with paper coating starch or protein material.

11 Claims, No Drawings

RESIN BLEND CONTAINING ETHYLENE/VINYL CHLORIDE INTERPOLYMER

This is a division, of application Ser. No. 877,486, filed Nov. 17, 1969 now U.S. Pat. No. 3,665,060.

MODIFIERS FOR RESIN COATINGS

This invention relates to modified interpolymers and to the use of these interpolymers as pigment binders or adhesives in pigment coating compositions for paper, paperboard and similar materials. More particularly, this invention provides ethylene/vinyl chloride interpolymers modified with interpolymers of alpha, beta-unsaturated polybasic carboxylic acids. In addition, this invention provides such modified interpolymers as new compositions of matter which find particular utility as adhesives or binders in pigment coating compositions for paper and paperboard.

Ethylene/vinyl chloride interpolymers have been used as pigment binders or adhesives in pigment coating compositions. They have the advantage of providing coatings with good thermoplasticity, acceptible gloss ratings and "pick resistance" in standard tests.

Efforts to improve the adhesive quality of ethylene/vinyl chloride interpolymers has been frustrating prior to this invention. For example, attempts to incorporate acrylic acid, methacrylic acid and alkali metal or ammonium salts directly into such ethylene/vinyl chloride polymers in the hope of increasing the adhesive quality of the resulting latex fail. Not only did the acrylic acid and like monomers fail to react extensively, but, surprisingly they stopped the polymerization reaction of the ethylene and vinyl chloride, and their use resulted in poor latex polymers for pigment binder applications.

In view of the state of the art, it has become desirable to provide ethylene/vinyl chloride interpolymers which are useful in pigment binder compositions.

It is, accordingly, an object of this invention to provide new interpolymer compositions which provide significant improvement in K+N brightness, gloss and excellent affinity for printing inks when used in pigment coating compositions.

Other objects and advantages of this invention will be apparent to those skilled in the art from the following detailed description and claims.

In accordance with this invention it has been found that the above and still further objects are achieved when ethylene/vinyl chloride interpolymers modified with interpolymers of alpha, beta-unsaturated polybasic carboxylic acids of the type hereinafter described are used in pigment coating compositions. Such pigment coating compositions containing the modified interpolymers give dramatically improved adhesiveness or pick resistance when applied to paper or paperboard substrates.

The invention is primarily directed to the preparation and use of modified ethylene/vinyl chloride interpolymers in pigment binding applications.

The ethylene/vinyl chloride interpolymers which are modified according to this invention generally contain from about 5 percent to about 70 percent ethylene, from about 30 to about 95 percent vinyl chloride, and from about 0.0 percent to about 10 percent of acrylamide. All or part of the acrylamide in the interpolymer may be replaced by polar monomers such as acrylonitrile, N-(lower alkyl)acrylamide and N-(lower alkyl)-methacrylamide containing from one to three carbon atoms in said lower alkyl groups, N-methylol acrylamide, N[2-(2-methyl-4-oxopentyl)]acrylamide, acrylic acid, methacrylic acid, and alkali metal and ammonium salts of acrylic and methacrylacrylic acids, maleic acid, fumaric acid, half and complete alkali metal and ammonium salts of maleic and fumaric acid, aconitic acid, itaconic acid, citraconic acid, and alkali metal and ammonium salts thereof, acrylyl and methacrylyl esters of hydroxyalkanoic acids having from two to about six carbon atoms in the alkanoic acid moieties, acrylylamides and methacylylamides of aminoalkanoic acids having from two to about six carbons in the aminoalkanoic acid, hydroxyethyl and hydroxypropyl esters of acrylic, methacrylic, maleic and fumaric acids, vinyl esters of alkanoic acids having from one to six carbon atoms such as vinyl acetate, viny propionate, and lower alkyl (one to six carbon atoms) sulfonic acid, phenylsulfonic acids, and alkylphenylsulfonic acids and acrylyl and methacrylyl esters of hydroxyalkylsulfonic acids having from one to six carbon atoms in said alkyl moieties, and hydroxyalkylsulfonamides having from one to six carbon atoms in said hydroxyalkyl moieties. The acrylamide generally should constitute at least 50 percent by weight of the third or polar monomer of said interpolymer and preferably constitutes at least about 80 percent of said polar monomer.

Thus the ethylene/vinyl chloride interpolymers as prepared in aqueous dispersed form are at least copolymers containing ethylene and vinyl chloride. The interpolymers may also be terpolymers containing ethylene, vinyl chloride and acrylamide and may be a quaternary or higher polymers containing one or more of the above exemplified additional polar monomers in small quantities but generally such additional monomers will not be present in the interpolymer in quantities greater than about 2 percent by weight.

It is preferred that the interpolymer contain from about 5 percent to about 70 percent ethylene, 30 percent to about 95 percent vinyl chloride, and from about 1 percent to about 5 percent acrylamide. A specific example of choice, as presently understood, is a terpolymer containing from about 19 to 23 percent ethylene, about 74 to about 78 percent vinyl chloride, and from about 2 to about 4 percent acrylamide.

Although the ethylene/vinyl chloride interpolymers used in the practice of this invention are generally unmodified, the modified ethylene/vinyl chloride interpolymers are included for use in this invention. The interpolymers are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g., hydrochloric, sulfuric, phosphoric, nitric. The base or acid used preferably has an ionization constant higher than $10^{-4}$ at 25° C.

The hydrolyzing treatment, performed with an acid or a base need not be performed to the same extent, especially if the interpolymer contains polar monomers in addition to the acrylamide. The aqueous dispersion or polymer latex of the ethylene, vinyl chloride, and acrylamide is generally treated with aqueous base or acid in an amount which is chemically equivalent to up to about 100 percent of the amide equivalent in the interpolymer.

Specific examples of polar monomers which may be used, as described above, to replace part of the acrylamide in the polymers of this invention include acrylonitrile, N-methacrylamide, N-ethylacrylamide, N-propylacrylamide, methacrylamide, acrylic, methacrylic, maleic, fumaric, itaconic, aconitic, and citraconic acids and alkali metal and ammonium salts of such acids, preferably the sodium, potassium or ammonium salts, alkyl esters of such acids, e.g., methyl acrylate, ethylacrylate, butyl acrylate, methyl methacrylate, butyl methacrylate, ethyl methacrylate, monoethyl maleate, dipropyl fumarate, acrylyl 3-hydroxypropionate, methacrylyl 4-hydroxybutanoate, N-acrylyl acetamide, N-methacrylyl hexamide, 2-hydroxyethyl and 2-hydroxypropyl esters of acrylic, methacrylic, maleic, fumaric, itaconic, aconitic, and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxypropylsulfonic acid, and N-acrylyl and N-methacrylyl 2-hydroxypropanamides.

The foregoing ethylene/vinyl chloride interpolymers are readily prepared by various means known to the art. The ethylene/vinyl chloride copolymers used in this invention are preferably prepared by a process which comprises mixing the ethylene and vinyl chloride monomers in the presence of an alkaline buffered redox initiator-catalyst system, water and from about 1% to about 8% by weight based upon the monomer feed, and from about 4% to about 7% by weight based upon the polymer product, of a nonionic emulsifying agent having a HLB value chyrdophilic-lipophilic balance of an emulsifier) of from about 10 to about 17, and reacting the mixture at a temperature and pressure and for a time sufficient to cause polymerization of the monomers. Other suitable emulsifying agents include anionic emulsifiers having a HLB value of at least 10.

The ethylene, vinyl chloride, acrylamide interpolymers may be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The acrylamide, preferably in aqueous solution either alone or mixed with the appropriate amounts of other polar monomers, is added to the polymerizing ethylene and vinyl chloride mixture gradually throughout the reaction. The addition of the acrylamide is preferably begun after about 40 to 50 percent of the desired conversion of the ethylene and vinyl chloride has been reached. A shell-core latex in which the polar monomer is concentrated in the outer layers is produced.

Examples of the ethylene/vinyl chloride interpolymer latices which can be modified in the practice of this invention are shown in Table I.

Illustrative of other ethylene/vinyl chloride interpolymers which may also be employed in the compositions of this invention are ethylene/vinyl chloride/acrylamide hydroxyethylacrylate, ethylene/vinyl chloride/acrylamide/N-isopropylacrylamide, ethylene/vinyl chloride/acrylamide/N-ethylmethacrylamide, ethylene/vinyl chloride/acrylamide/diammonium itaconate, ethylene/vinyl chloride/acrylamide/monobutyl acid maleate and ethylene/vinyl chloride/acrylamide/N-methacrylylpropionamide.

The interpolymers of alpha, beta-unsaturated polybasic carboxylic acids include interpolymers of polybasic carboxylic acids or anhydrides thereof, having from four to about six carbon atoms with alpha-olefins, alkyl vinyl ethers or vinyl alkanoates.

Because of cost and availability maleic anhydride is preferred for preparing these copolymers although free maleic acid, fumaric acid, and other homologous or related di and tricarboxylic acids such as itaconic acid, aconitic, citraconic acids or anhydrides thereof can also be used, if desired, to react with the alpha-olefin alkyl vinyl ether, or vinyl alkanoate monomers.

The alpha-olefins used to prepare these "maleic-type" interpolymers may be aliphatic alkene alpha-olefinically unsaturated hydrocarbons having from two to about 40 carbon atoms such as ethylene, propylene, butylene and higher alpha-olefin hydrocarbons which may be branched or straight chained, e.g., 3-methyl-1-pentene, 4-methyl-1-pentene, 1-hexene, isooctene, 1-dodecene, 1-hexadecene, 1-octadecene, 1-docosene, 1-tricontene, etc. Preferably, however, the alpha-olefin is a monocyclic aromatic hydrocarbon alpha-olefin such as styrene, vinyltoluene, vinylxylene, chlorinated styrenes, etc. Mixtures of alpha olefins may be used if desired.

Alkyl vinyl ethers may also be used as a comonomer with maleic anhydride or one or more of its equivalents to prepare useful interpolymers for use in this invention. They may be prepared in conventional manner by treatment of an alcohol with an alkali catalyst followed by reaction with acetylene. The alcohols used can be straight or branched chained. naturally occurring or synthetic, e.g., those resulting from the "oxo" and other processes. These vinyl ethers are of the general formula $Z-O-CH=CH_2$ wherein Z is an alkyl group containing from two to about 40 carbon atoms, and preferably from about 10 to about 32 carbon atoms. Representative vinyl ethers include, for example, oxo-decyl, oxo-tridecyl, oxo-hexadecyl, oxo-nonadecyl, propyl, hexyl, n-decyl, n-dodecyl, n-octadecyl, n-tetradosyl, n-tritriacontyl, tetratriacontyl, hexatriacontyl vinyl ether. Aryl vinyl ethers, alkoxyalkyl vinyl ethers, aryloxyakyl vinyl ethers, and alkylaryl vinl ethers and the like such as phenyl, benzyl, tolyl, dodecylphenyl, octadecylphenyl, xylyl, dinonylphenyl, methoxyphenyl, ethoxyphenyl, dodecyloxyphenyl, octadecyloxyphenyl, phenoxyphenyl, phenoxyhexyl, phenoxyoctyl, phenoxyocatadecyl vinyl ethers could also be used to react with the maleic-type of alpha, beta-unsaturated polycarboxylic acid or anhydride to form the interpolymers used in this invention. Mixtures of alkyl vinyl ethers obtained from mixed alcohols of the type described above may also be used.

The vinyl alkanoate esters which are used as comonomers with maleic anhydride or related compounds include those having up to about 22 carbon atoms in the alkanoate moiety. For example, viny acetate, vinyl propionate, vinyl butanoate, vinyl pentanoate, vinyl hexanoate, vinyl heptanoate, and vinyl octanoate and higher alkanoates may be used. Vinyl acetate is preferred. Related compounds having the polymerizable double bond in the acid moiety of the ester such as methyl methacrylate, methyl acrylate, ethyl acrylate may also be used.

The interpolymers are preferably copolymers of maleic anhydride with one other type of monomer, that is, an alpha-olefin, an alkyl vinyl ether, or a vinyl alkanoate, However, third comonomers of the same or from one of the other mentioned types could also be used to prepare three or more component interpolymers. It is preferred that the maleic anhydride be used in the molar range of from 0.9 to 1.1 moles to 1 mole of the alpha-olefin, alkyl vinyl ether, or vinyl alkanoate comonomer. The interpolymers may be used as low molecular polymers of low viscosity or have higher molecular weight materials ranging from about 1,000 to about 200,000. It is preferred to use interpolymers having specific viscosities in the range of from about 0.2 to 3.0.

The following specific examples are further illustrative of the nature of the present invention, but it is to be understood that the invention is not limited thereto.

Example 1

An example of a suitable oxo-tridecyl vinyl ether/maleic anhydride copolymer which can be used is one prepared as follows:

Oxo-tridecyl vinyl ether (226.4 g, 1.00 mole) in 500 g of xylene was heated slowly to 70°, stirred, and nitrogen-purged (air was removed) and then 5 ml of a 10 ml solution of 0.34 g (0.25% on maleic anhydride) of azo-bis-iso-butyronitrile (initiator) in benzene was added at once at 72° C and maleic anhydride (103 g, 1.05 moles) was added proportionately with the remaining solution of initiator over 2 hours at 71°–72° C. The mixture was stirred for an additional 2.5 hours at 73°–74° C at the end of which time no unreacted maleic anhydride and only a trace of the tridecyl vinyl ether was noted by infrared analysis. The specific viscosity of a sample of the copolymer was 1.50 (fourfold the time ratio for drainage of a 1% solution of polymer in methyl ethyl ketone in a capillary viscometer).

Example 2

A mixed olefin/maleic anhydride copolymer is prepared as follows:

To a 22 liter flask equipped with stirrer, thermometer, reflux condenser, nitrogen inlet tube, and additional funnel, there was added 4,500 g (20.0 moles) of a commercially available $C_{14}$-$C_{18}$ mixed aliphatic alkene alpha-olefin, and about one-half of 5,309 g (50.0 moles) of mixed xylenes. The flask was purged with nitrogen while the mixture was heated to about 140° C over about 1 hour. Then about one-half of 131.6 g. (0.9 mole) of di-tert-butyl peroxide was added to the flask and addition of a solution of maleic anhydride and the other half of the di-tert-butyl peroxide dissolved in the other half of the xylene was added from the addition funnel over about 60 minutes while controlling the temperature at from 140° C. to about 145° C. Tert-butanol distillation was noted after about 45 minutes of addition. The mixture was held at 136°–140° C. for 2 hours and then xylene was stipped out of the reaction mixture over a 133 minute period at temperatures of from 138° C up to about 170° C. The pressure was dropped to a final pressure of 40 mm as the temperature increased. Total distillate including tert-butanol was 5,530 g. The viscous yellow resin polymer obtained as residue weighed 7,015 g and was poured into storage containers. Upon cooling it solidified to a yellow-colored brittle glass. It was pulverized sufficiently to pass through a 20 mesh screen. The copolymer had a specific viscosity of 0.24 as measured on a 4% solution in methylethylketone at 25° C. The average molecular weight was 2,095.

In the examples herein the styrene-maleic anhydride copolymer employed is prepared in the following manner:

Example 3

Substantially equimolecular propotions of styrene and maleic anhydride were heated for approximately 4 hours in xylene at 100° C under a slight pressure in the presence of 0.25% benzoyl peroxide catalyst based on the combined weight of the two monomers. The weight ratio of styrene plus maleic anhydride to solvent was 10% so that after the reaction an approximate 10% slurry of styrene-maleic anhydride copolymer was obtained. After the reaction was complete, the slurry was filtered and the filter cake dried in a vacuum drier.

About 90 parts of substantially dry styrene-maleic anhydride copolymer was stirred vigorously in a suitable reaction vessel while gaseous ammonia was added thereto. The copolymer contained substantially equal portions of styrene and maleic anhydride, and had a specific viscosity of about 0.29 in methyl ethyl ketone. The copolymer reacts exothermically with the ammonia. Thus, the temperature of the reaction mixture is a function of the rate of ammonia addition. In this example, the ammonia was added at a rate such that the maximum reaction temperature was approximately 65° C. At the completion of the reaction, the take up of ammonia ceases. This usually requires approximately 10% in excess of the theoretical 2 moles of ammonia per mole of anhydride. In the instant case about 17 parts of ammonia were used in the reaction. The resulting product, substantially devoid of carboxyl groups, was a white, free-flowing powder readily soluble in water and having an ammoniacal odor.

Example 4

A mixture of methyl half ester of maleic acid and maleic anhydride is prepared by reacting 45 parts of maleic anhydride and five parts of methanol. The reaction mixture is then polymerized with 50 parts of styrene. The resulting copolymer has a low residual monomer content and is soluble in aqueous solutions of alkaline materials.

Example 5

About 80 parts of substantially dry styrene-maleic anhydride-methyl ester of maleic acid heteropolymer prepared in Example 4 is stirred vigorously with about 44 parts of a 49% sodium hydroxide solution. There is produced approximately 111 parts of the sodium salt of the heteropolymer which is a substantially dry, finely divided powder and readily soluble in water.

Example 6

A mixture of methyl half ester and secondary butyl half ester of maleic acid is prepared by reacting 41 parts of maleic anhydride, 21 parts of secondary butyl alcohol and 3 parts of methanol. The reaction mixture is then polymerized with 61 parts of styrene to produce a secondary butyl ester of the methyl ester of styrene/maleic anhydride copolymer.

Example 7

A mixture of methyl half ester and secondary butyl half ester of maleic acid is prepared by reacting 41 parts of maleic anhydride, 21 parts of secondary butyl alcohol and 3 parts of methanol. The reaction mixture is then polymerized with 62 parts of styrene to produce a secondary butyl ester of the methyl ester of styrene/maleic anhydride copolymer.

In order to prepare a satisfactory coating mixture, it is necessary to break up aggregates of dry clay into small dispersed particles. This is conventionally

TABLE I

| Polymer Example No. | Hydrolyzed | VCl % | Ethylene % | Acrylamide % | Sodium Acrylate % | Sodium Methacrylate % | Latex % Polymer Solids | % SLS |
| --- | --- | --- | --- | --- | --- | --- | --- | --- |
| 8 | No | 76 | 21 | 3 | — | — | 47.0 | 1.5 |
| 9 | No | 74.9 | 25 | 0.50 | — | — | 47.3 | 0.9 |
| 10 | No | 70.5 | 27 | 2.36 | — | — | 45.7 | 1.79 |
| 11 | No | 74.0 | 25 | 1.48 | — | — | 48.1 | 1.40 |
| 12 | No | 72.2 | 27 | 0.65 | — | — | 47.7 | 2.06 |
| 13 | No | 72 | 18 | 3.0 | — | — | — | — |
| 14 | Yes | 76 | 21 | 3 | — | — | 49.0 | — |
| 15 | Yes | 74.9 | 25 | 0.5 | — | — | 46.1 | — |
| 16 | Yes | 70.5 | 27 | 2.36 | — | — | 44.2 | — |
| 17 | Yes | 74.0 | 25 | 1.48 | — | — | 46.9 | — |
| 18 | No | 76 | 21 | 2.3 | 0.7 | — | 43 | 1.1 |
| 19 | No | 76 | 21 | 2.3 | — | 0.7 | 43 | 1.1 |
| 20 | No | 70 | 30 | — | — | — | 44 | — |
| 21 | No | 74.8 | 25.2 | — | — | — | 51.3 | — |
| 22 | No | 70.5 | 29.5 | — | — | — | 44.8 | — |
| 23 | No | 75 | 25 | — | — | — | 45.2 | — |

Subsequently described in detail are coating compositions which are aqueous dispersions of mineral and binder. Separately described are paper coatings which are dried, finished coatings of mineral adhered to the paper base.

The improved coating compositions of the present invention are in the form of aqueous dispersions comprising water, a finely divided paper coating pigment or mineral and at least 4% by weight based upon said pigment of a polymeric binder, at least a portion of said binder being a modified ethylene/vinyl chloride interpolymer of the types described above. The coating compositions of this invention preferably contain from about 30 to about 75% dispersed solids although compositions outside this range can be used if convenient or ease of coating can be sacrificed.

The paper coating mineral or pigment is an important component of the coating composition. The principal functions of the pigment are to fill in the irregularities of the paper surface, to produce an even and uniformly absorbent or absorbent surface for printing and to improve the appearance of the coated sheet. A suitable pigment should have all or most of the following properties: good dispersability in water, correct particle size distribution, high opacifying power, high brightness, low water absorption, nonabrasive qualities, chemical inertness, compatibility with other ingredients of the coating mixture, low adhesive requirements, and if colored, a high tinctorial power and color permanence. Suitable pigment materials include minerals such as clays such as kaolinite, illite, montmorillonite and beidellite; and other materials such as titanium dioxide (e.g., either anatase or rutile form), kieselguhr, precipitated calcium carbonate, water-ground calcium carbonate, calcium sulfate, barium sulfate, blanc fixe, satin white and zinc pigments, e.g., zinc oxide, zinc sulfide and lithopone.

The quality of pigment or mineral in the paper coating composition of this invention can vary from about 10% to about 75% by weight of the total aqueous dispersion. Narrower preferred ranges will vary depending upon variations within the binder, upon the particular clay or pigment utilized, and upon the desired uses of the finished paper product.

achieved by adding water and a dispersing agent to the clay solids and agitating the mixture. The clay-water slurries can range from about 30% to about 80% solids. Suitable dispersing agents include sodium silicate, sodium tetraphosphate, tetrasodium pyrophosphate, sodium hexametaphosphate, alkali metal salts or acyl alkyl sulfonic acids and alkaline casein. The quantity of dispersing agent used will vary depending upon the particular compound chose, the amount of water in proportion to the clay, and the desired effectiveness of the dispersion. From 0.1 to 0.5% tetrasodium pyrophosphate based on the weight of clay gives an effective dispersion of Georgia keolinite clay in a 50—50 clay-water slurry. Other concentrations of dispersing agents for other clay slurries can be readily determined. Aqueous clay dispersions can be prepared using heavy-duty mixers such as sigma-blade and dough type mixers.

The novel pigment binder of the present invention is a modified ethylene/vinyl chloride interpolymer. The modified interpolymer used alone is a satisfactory pigment binder based on performance characteristics of the coated paper. Cost and performance requirements for most applications, however, dictate the inclusion of other binders such as various types of starch and starch products and protein materials along with the modified ethylene/vinyl chloride interpolymer latex formulation. Such a dilution, a common practice in the use of synthetic resinous pigment binders provides a significant reduction in cost with only a slight reduction in properties of the coated paper. The ratios of starch or protein solids to the modified ethylene/vinyl chloride interpolymers include, e.g., 95:5, 67:33, 60:40, 40:60, 20:80, 5:95 and 0:100. The choice of which ratio binder to use will depend upon the properties desired in the final product, the cost of the binder, upon the particular modified ethylene/vinyl chloride interpolymer latex employed, and processing properties of the coating.

Superior appearance and printing characteristics of coated paper are obtained using a coating composition having from about 1% to about 100%, preferably from about 5% to about 25% by weight binder solids based upon mineral present in the composition. Preferably the modified ethylene/vinyl chloride interpolymer is present in the composition at concentrations of from about 2% to about 25% of the mineral.

The modified interpolymers are prepared in accordance with the present invention by mixing the polybasic carboxylic acid interpolymer with an ethylene/vinyl chloride interpolymer heretofore described. The polybasic carboxylic acid interpolymer can constitute from about 1% to about 50% by weight of the ethylene/vinyl chloride interpolymer. It is preferred, however, to employ compositions containing between about 1.0% to about 20% of the polybasic carboxylic acid interpolymer.

The ethylene/vinyl chloride interpolymer latex is generally blended with the polybasic carboxylic acid interpolymer solution after the polybasic carboxylic acid interpolymer has been cooked. For example, the polybasic carboxylic acid interpolymer solution is cooked with agitation at about 90°–95° C for approximately 15 minutes, then cooled to about 65°–70° C. The cooked polybasic carboxylic acid interpolymer solution is then added to the ethylene/vinyl chloride interpolymer latex to provide a total solids content of the polybasic carboxylic acid interpolymer ethylene/vinyl chloride interpolymer blend of from about 1% to about 50%. The cooling is carried out only for laboratory control. In commercial practice, solutions may be applied over a wide temperature range normally practiced in the paper manufacturing industry. The resin can be cooked and added to the coating before or after the ethylene/vinyl chloride interpolymer is added.

In the following examples the modified interpolymer is added to an aqueous kaolin clay pigment slurry wherein the clay slurry contains 70% solids. The modified interpolymer is added at a level of 19.8 parts per 100 parts of dry clay. The total solids of the resulting coating composition is adjusted to 58%.

The concentrations of the modified interpolymers utilized will, of course, vary with differing polycarboxylic acid modified interpolymers, base stocks, product specifications and other factors.

The paper to which the compositions are applied in carrying out the present invention include papers of all types, such as bond writing paper, fibrous paperboards such as cardboard, chipboard, carton stock, glassine, parchment and the like, wrapping papers or boards, or liners for containers intended for the packaging of foods, greases, chewing gum, soap, soap powders, cosmetics, calking compounds, etc. The coated papers may also be used as wallpapers, papers for lining drawers and shelves, especially in linen closets, kitchen cabinets and the like, and the coated paper or paperboards may be used as bookcovers or book pages. The compositions may be applied to provide solvent and toner holdout in electrofax paper and high ink holdout in printing paper.

The processes for applying the modified interpolymer coating to the paper or paperboard are well known in the art. Such techniques include spraying, roller coating, air-knife coating, trailing blade coating, curtain coater, and use of a Mayer rod (machine).

The coatings are applied to the paper or paperboard using the indicated wire wound rod. The coated paper products are dried at 120° C for one minute and conditioned at 72° F and 50% relative humidity and calendared before testing.

The coatings are then tested for various physical properties. The test procedures are hereinafter described and the results are listed in Tables III and IV.

The test methods used to determine the physical properties of the paper product coated with the modified compositions are listed below. The paper base stock used in the testing hereinafter described is an offset coating base paper and sulfite bleached paperboard.

IGT Printability Test — An ink of measured tackiness is applied uniformly to a standard diameter wheel. A strip of paper or paperboard containing the test coating is fastened to a spring-loaded cylindrical segment of known diameter. The inkladen wheel is placed against the strip at a pressure of 50 kilograms or 70 kilograms. The cylinder spring is released and the tacky ink is applied to the strip at an accelerated velocity. If the coating fails "picks", a break in the coating will be apparent at some point on the strip. This is measured and reported as the velocity in feet per minute withstood by the coating before failure. The test is run with inks of increasing tack until failure occurs.

Gloss Ink Holdout — This test measures the ability of a paper coating to hold a glossy ink or varnish on its surface for a period of time before absorption therein. A standard ink is applied to coated liner board by a proof press or hand brayer. The reflectance of the ink after drying is measured at a 75° angle of incidence.

K+N Brightness — K+N brightness of the test paper coating is measured in the following manner: A standard purple testing ink (K+N ink) is swabbed on the sheet and left for 1 minute, then wiped off completely. A perpendicular light source and reflectance measuring device is adjusted to read 100% reflectance from a calcium carbonate block. Values are reported as percent reflectance obtained from a coated liner board. The higher the value obtained, the less the ink is absorbed into the coating.

TABLE II

| Composition | E/VCl Interpolymer | | Modifying Polymer | | | Total % Solids in Final Latex |
| --- | --- | --- | --- | --- | --- | --- |
| | Example Number | Polymer Solids Parts by Wt. | Example Number | Solids Parts by Wt. | % | |
| A | 8 | 18 | — | — | — | 29.7 |
| B | 8 | 18 | 5 | 1.8 | 10 | 35.8 |
| C | 8 | 18 | 4 | 1.8 | 10 | 33.8 |
| D | 8 | 18 | 6 | 1.8 | 10 | 33.8 |
| E | 8 | 18 | 7 | 1.8 | 10 | 33.8 |

TABLE III

| Example No. | Composition from Table II | Parts by Wt. | Clay Parts by Wt. | Total % Solids in Pigment Coating Composition | Brookfield Viscosity cp –25°C No. 2 Spindle–rpm | | | |
|---|---|---|---|---|---|---|---|---|
| | | | | | 10 | 20 | 50 | 100 |
| 24 | A | 18 | 100 | 58 | 244 | 154 | 93 | 84 |
| 25 | B | 19.8 | 100 | 58 | 3020 | 1686 | >800 | >400 |
| 26 | C | 19.8 | 100 | 58 | 6920 | 4050 | >2000 | >1000 |
| 27 | D | 19.8 | 100 | 58 | 880 | 522 | 263 | 169 |
| 28 | E | 19.8 | 100 | 58 | 1240 | 730 | 380 | 238 |

TABLE IV

| | lb/3300 ft$^2$ | | IGT Printability/Feet | | Gloss Ink Holdout | | K+N Brightness | |
|---|---|---|---|---|---|---|---|---|
| Example No. | Board | Paper | Board No. 6 Ink | Paper No. 5 Ink | Board | Paper | Board | Paper |
| 24 | 15.4 | 12.6 | 328 | 250 | 61.6 | 68.1 | 39.9 | 51.4 |
| 25 | 9.0 | 10.9 | 428 | 270 | 60.0 | 74.0 | 50.0 | 55.0 |
| 26 | 9.1 | 10.7 | 402 | 320 | — | 74.5 | 49.0 | 57.0 |
| 27 | 9.8 | 9.8 | 402 | 310 | 59.0 | 75.8 | 49.2 | 56.2 |
| 28 | 9.2 | 10.8 | 378 | 322 | 59.6 | 77.0 | 51.1 | 57.0 |

Note: All Coatings—coated one side, No. 8 rod used on paper, No. 10 rod used on paperboard.

Example 29

For this example 75% solids weight of Composition C, Table II, was mixed with 25% solids by weight of an alpha-soy protein and of the resulting mixture 18 parts was mixed with 100 parts solids aqueous clay pigment suspension, as the pigment binder therein resulting in a 58% solids pigment coating composition. Paper coated with this composition exhibited good pick resistance, good K+N brightness characteristics and good gloss ink holdout.

Example 30

Following the procedure of Example 29, converted corn starch is substituted for the soya protein. Paper coated with the resulting composition had good pick resistance, good K+N brightness characteristics and very good gloss ink holdout.

Results similar to those detailed above are obtained when other and different modified ethylene/vinyl chloride interpolymers of this invention are employed in paper coating applications. Such other and different modified interpolymers include the following:

TABLE V

| | Components | | |
|---|---|---|---|
| | Modifying Polymer | | E/VCl Interpolymer |
| Composition | Example No. | % | Example No. |
| F | 1 | 10 | 8 |
| G | 4 | 20 | 14 |
| H | 6 | 35 | 13 |
| I | 7 | 20 | 23 |
| J | 6 | 20 | 14 |
| K | 2 | 40 | 13 |
| L | 6 | 10 | 23 |
| M | 4 | 30 | 8 |
| N | 7 | 15 | 14 |
| O | 4 | 30 | 13 |
| P | 4 | 10 | 23 |
| Q | 2 | 20 | 8 |

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

1. A coated paper product comprising a paper base having on at least one surface of said paper base a coating comprising a finely divided paper coating mineral and a pigment binder, said pigment binder comprising a composition comprising (1) an interpolymer selected from the group consisting of (a) an interpolymer containing from about 5 to 70 percent ethylene, from about 30 to about 95 percent vinyl chloride, and from about 0.0 to about 10 percent of at least one other polar monomer, said polar monomer content being selected from the group consisting of acrylamide, acrylonitrile, N-(alkyl) acrylamide, having from one to three carbon atoms in said alkyl groups, methacrylamide, N-(alkyl) methacrylamide, having from 1 to 3 carbon atoms in said alkyl groups, N-methylol acrylamide, N[2-(2-methyl-4-oxopentyl)] acrylamide, acrylic acid, methacrylic acid and alkali metal and ammonium salts of acrylic acid, methacrylic, maleic and fumaric acids, itaconic and citraconic acids, half alkyl esters of maleic, fumaric, itaconic, and citraconic acids having from one to six carbon atoms in said alkyl groups, acrylyl and methacrylyl esters of hydroxyalkanoic acids having from two to six carbon atoms in said alkanoic acids, acrylylamide and methacrylyamides of aminoalkanoic acids having from two to six carbon atoms in said aminoalkanoic acid, hydroxyethyl and hydroxypropyl esters of acrylic, methacrylic, maleic and fumaric acids, vinyl esters of alkanoic acids having from one to six carbon atoms and alkyl sulfonic acid having from one to six carbon atoms, phenylsulfonic acids, and acrylyl and methacrylyl esters of hydroxyalkylsulfonic acid having from one to six carbon atoms in said alkyl moieties, and hydroxyalkylsulfonamides having from one to six carbon atoms in said hydroxyalkyl moieties;

and (b) interpolymers of the type described in (a) treated with an acid or a base having an ionization constant higher than about $10^{-4}$ in amounts equivated to up to about 100 percent of the amide content of said interpolymer and between about 0.1 and about 50% based on the weight of (1) of (2) a salt of an interpolymer of an alpha, beta-unsaturated polycarboxylic acid having from four to six carbon atoms and a member of the group consisting of (a) alpha olefins, (b) alkyl vinyl ethers, (c) vinyl alkanoates, said salts being selected from the group consisting of alkali metal and ammonium.

2. A coated paper product in accordance with claim 1 wherein component (1) is a terpolymer containing from about 5 to 70 percent ethylene, from about 30 to 95 percent vinyl chloride and from about 0.1 to 10 percent acrylamide and component (2) is a salt of an interpolymer of an alpha, beta-unsaturated polybasic carboxylic acid and an alpha-olefin.

3. A coated paper product as described in claim 1 wherein component (1) is a terpolymer containing about 19 to 23 percent ethylene, about 74 to 78 percent vinyl chloride, and from about 2 to 4 percent acrylamide in aqueous dispersion treated with sodium hydroxide in an amount stoichiometrically equivalent to about 10 to 100 percent of the amide group content of said terpolymer.

4. A coated paper product comprising a paper base having on at least one surface of said paper base, a coating comprising a finely divided paper coating mineral and from about 15% to about 25% by weight based upon the total coating of a pigment binder, said pigment binder consisting of approximately 50% of a substance selected from the group consisting of pigment binding starches, and proteinaceous materials and approximately 50% of a composition comprising (1) an interpolymer selected from the group consisting of (a) an interpolymer containing from about 5 to 70 percent ethylene, from about 30 percent to about 95 percent vinyl chloride, and from about 0.0 to about 10 percent of at least one other polar monomer of said polar monomer content being selected from the group consisting of acrylamide, acrylonitrile, N-(alkyl) acrylamide, having from 1 to 3 carbon atoms in said alkyl groups, methacrylamide, N-(alkyl) methacrylamide, having from one to three carbon atoms in said alkyl groups, N-methylol acrylamide, N[2-(2-methyl-4-oxopentyl)] acrylamide, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from one to six carbon atoms in said alkyl groups, acylyl and methacrylyl esters of hydroxyalkanoic acids having from two to six carbon atoms in said alkanoic acids, acrylylamide and methacrylylamides of aminoalkanoic acids having from two to six carbon atoms in said aminoalkanoic acid, hydroxyethyl and hydroxypropyl esters of acrylic, methacrylic, maleic, and fumaric acids, vinyl esters of alkanoic acids having from one to six carbon atoms and alkyl sulfonic acid having from one to six carbon atoms, phenylsulfonic acids, and acrylyl and methacrylyl esters of hydroxyalkylsulfonic acid having from one to six carbon atoms in said alkyl moieties, and hydroxyalkylsulfonamides, having from one to six carbon atoms in said hydroxyalkyl moieties; and (b) interpolymers of the type described in (a) treated with an acid or a base having an ionization constant higher than about $10^{-4}$ in amounts equivated to up to about 100 percent of the amide content of said interpolymer and between about 0.1 and about 50% based on the weight of (1) of (2) a salt of an interpolymer of an alpha, beta-unsaturated polycarboxylic acid having from four to six carbon atoms and a member of the group consisting of (a) alpha olefins, (b) alkyl vinyl ethers, (c) vinyl alkanoates, said salts being selected from the group consisting of alkali metal and ammonium.

5. A coated paper product in accordance with claim 1 wherein the paper base is paper.

6. A coated paper product in accordance with claim 1 wherein the paper base is paperboard.

7. A paper coating composition comprising water, a finely divided paper coating mineral and a polymeric binder, said binder containing at least a portion of a modified ethylene/vinyl chloride interpolymer composition comprising (1) an interpolymer selected from the group consisting of (a) an interpolymer containing from about 5 to 70 percent ethylene, from about 30 to about 95 percent vinyl chloride, and from about 0.0 to about 10 percent of at least one other polar monomer, said polar monomer content being selected from the group consisting of acrylamide, acrylonitrile, N-(alkyl) acrylamide, having from 1 to 3 carbon atoms in said alkyl groups, methacrylamide, N-(alkyl)methacrylamide, having from 1 to 3 carbon atoms in said alkyl groups, N-methylol acrylamide, N[2-(2-methyl-4-oxopentyl)] acrylamide, acrylic acid, methacrylic acid and alkali metal and ammonium salts of acrylic and methacrylic acid, maleic and fumaric acids, itaconic, and citraconic acids, half alkyl esters of maleic, fumaric, itaconic, and citraconic acids having from 1 to 6 carbon atoms in said alkyl groups, acylyl and methacrylyl esters of hydroxyalkanoic acids having from 2 to 6 carbon atoms in said alkanoic acids, acrylylamide and methacrylylamides of amino-alkanoic acids having from 2 to 6 carbon atoms in said amino-alkanoic acid, hydroxyethyl and hydroxypropyl esters of acrylic, methacrylic, maleic and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkylsulfonamides, having from 1 to 6 carbon atoms in said hydroxyalkyl moieties; and (b) interpolymers of the type described in (a) treated with an acid or a base having an ionization constant higher than about $10^{-4}$ in amounts equivated to up to about 100 percent of the amide content of said interpolymer and between about 0.1 and about 50% based on the weight of (1) of (2) a salt of an interpolymer of an alpha, beta-unsaturated polycarboxylic acid having from 4 to 6 carbon atoms and a member of the group consisting of (a) alpha olefins, (b) alkyl vinyl ethers, (c) vinyl alkanoates, said salt being selected from the group consisting of alkali metal and ammonium, said binder being intimately dispersed in said water to form an aqueous dispersion.

8. A paper coating composition according to claim 7 wherein said composition contains from about 1 to about 100% based on the weight of the mineral of said polymeric binder.

9. A paper coating composition according to claim 7 wherein said composition contains from about 2 to about 25% by weight based on the weight of the mineral of the modified ethylene/vinyl chloride interpolymer composition.

10. A paper coating composition according to claim 7 wherein said mineral comprises from about 10% to about 75% by weight of the total composition.

11. A paper coating composition comprising water, from about 10 to about 75% by weight of a finely divided paper coating mineral, and from 1 to about 100% based on the weight of the mineral of a polymeric binder, said binder consisting of approximately 10 to 90% of a substance selected from the group consisting of pigment binding starches and proteinaceous materials and approximately 90 to 10% of a composition comprising (1) an interpolymer selected from the group consisting of (a) an interpolymer containing from about 5 to 70 percent ethylene, from about 30 to about 95 percent vinyl chloride, and from about 0.0 to about 10 percent of at least one other polar monomer, said polar monomer content being selected from the group consisting of acrylamide, acrylonitrile, N-(alkyl) acrylamide, having from 1 to 3 carbon atoms in said alkyl groups, methacrylamide N-(alkyl)methacrylamide, having from 1 to 3 carbon atoms in said alkyl groups, N-methylol acrylamide, N[2-(2-methyl-4-oxopentyl)] acrylamide, acrylic acid, methacrylic acid and alkali metal and ammonium salts of acrylic and methacrylic acid, maleic and fumaric acids, itaconic and citraconic acids, half alkyl esters of maleic, fumaric, itaconic and citraconic acids having from 1 to 6 carbon atoms in said alkyl groups, acylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkylsulfonamides, having from 1 to 6 carbon atoms in said hydroxyalkyl moieties; and (b) interpolymers of the type described in (a) treated with an acid or a base having an ionization constant higher than about $10^{-4}$ in amounts equivated to up to about 100 percent of the amide content of said interpolymer and between about 0.1 and about 50% based on the weight of (1) of (2) a salt of an interpolymer of an alpha, beta-unsaturated polycarboxylic acid having from 4 to 6 carbon atoms and a member of the group consisting of (a) alpha olefins, (b) alkyl vinyl ethers, (c) vinyl alkanoates, said salt being selected from the group consisting of alkali metal and ammonium.

* * * * *